(12) United States Patent
Shellhammer

(10) Patent No.: US 7,831,414 B2
(45) Date of Patent: Nov. 9, 2010

(54) METHOD AND APPARATUS FOR DETECTING A PRESENCE OF A SIGNAL IN A COMMUNICATION CHANNEL

(75) Inventor: Stephen J. Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 11/866,391

(22) Filed: Oct. 2, 2007

(65) Prior Publication Data

US 2008/0086286 A1 Apr. 10, 2008

Related U.S. Application Data

(60) Provisional application No. 60/828,603, filed on Oct. 6, 2006.

(51) Int. Cl.
H04B 15/00 (2006.01)
G06F 19/00 (2006.01)
(52) U.S. Cl. ..................... 702/189
(58) Field of Classification Search .......... 702/189, 702/66, 67, 70, 71, 76, 77, 190, 191, 193; 324/76.12, 76.19, 76.39; 455/41.2, 226.2, 455/426.1; 370/332
See application file for complete search history.

(56) References Cited

U.S. PATENT DOCUMENTS

| | | | | |
|---|---|---|---|---|
| 5,909,471 A * | 6/1999 | Yun | ............................ | 375/343 |
| 6,480,236 B1 | 11/2002 | Limberg | | |
| 7,426,234 B2 * | 9/2008 | Simmons et al. | ............ | 375/150 |
| 7,574,328 B2 * | 8/2009 | Jaeger | ........................ | 702/193 |
| 2002/0114354 A1 * | 8/2002 | Sinha et al. | ................. | 370/503 |
| 2003/0072255 A1 * | 4/2003 | Ma et al. | .................... | 370/208 |
| 2003/0198308 A1 * | 10/2003 | Hoctor et al. | ............... | 375/354 |
| 2004/0043737 A1 * | 3/2004 | Bienek et al. | ............... | 455/255 |
| 2004/0047324 A1 * | 3/2004 | Diener | ...................... | 370/338 |
| 2006/0007299 A1 | 1/2006 | Wang et al. | | |
| 2007/0092045 A1 * | 4/2007 | Woo et al. | .................... | 375/343 |
| 2007/0100922 A1 * | 5/2007 | Ashish | ....................... | 708/400 |
| 2008/0045158 A1 * | 2/2008 | Ji | ............................. | 455/67.11 |
| 2008/0080604 A1 * | 4/2008 | Hur et al. | ..................... | 375/224 |

(Continued)

OTHER PUBLICATIONS

Cabric et al., "Spectrum Sharing Radios", 2006, IEEE, pp. 30-45.*

(Continued)

Primary Examiner—Cindy H Khuu
(74) Attorney, Agent, or Firm—Jeffrey Jacobs

(57) ABSTRACT

An apparatus, a cognitive radio, a processor, a method, and a machine-readable medium for detecting a presence of a signal in a communication channel are disclosed. An apparatus includes a processor configured to select one or more peak samples of two or more fields of a sampled signal and configured to determine one or more absolute values of the one or more peak samples of the two or more fields. In addition, the processor is configured to superimpose the one or more absolute values of the one or more peak samples of the two or more fields. The processor is further configured to combine the one or more absolute values that fall within a predetermined window to produce a peak value and configured to compare the peak value with a threshold to determine a presence of a signal in the communication channel.

20 Claims, 8 Drawing Sheets

U.S. PATENT DOCUMENTS

| | | | |
|---|---|---|---|
| 2008/0086286 A1* | 4/2008 | Shellhammer | 702/189 |
| 2008/0192810 A1* | 8/2008 | Razzell et al. | 375/150 |
| 2008/0287819 A1* | 11/2008 | Gregson et al. | 600/528 |
| 2008/0309829 A1* | 12/2008 | Turkenich et al. | 348/731 |
| 2009/0323835 A1* | 12/2009 | Rao et al. | 375/260 |

OTHER PUBLICATIONS

Suhas Mathur, Qualcomm Inc. "An Evaluate of the PN Sequence Based Detection of DTV Signals in the Draft," IEEE 802.22-06/xxxxr0, Sep. 2006.

IEEE P802.22™/D0.1 "Draft Standard for Wireless Regional Area Networks Part 22: Cognitive Wireless RAN Medium Access Control (MAC) and Physical Layer (PHY) Specifications: Policies and Procedures for Operation in the TV Bands," Prepared by the IEEE 802.22 Working Group of the LAN/MAN Standards Committee, Institute of Electrical Group and Electronics Engineers, Inc., Three Park Avenue, New York, NY 10016-5997, USA, May 2006.

Cabric D et al; "Implementation issues in spectrum sensing for cognitive radios"Signals, Systems and Computers, 2004. Conference Record of the Thirty-Eigth Asilomar Conference on Pacific Grove, CA, USA, USA Nov. 7-10, 2004, Piscataway, NJ, USA, IEEE, Nov. 7, 2004, pp. 772-776, XP010781056.

Muterspaugh M et al; "Thomson Proposal Outline for WRAN" Internet Citation, (Online) Nov. 7, 2005, XP002398489.

International Search Report—PCT/US07/080611, International Search Authority—European Patent Office—Apr. 11, 2008.

* cited by examiner

METHOD AND APPARATUS FOR DETECTING A PRESENCE OF A SIGNAL IN A COMMUNICATION CHANNEL

CLAIM OF PRIORITY UNDER 35 U.S.C. §119

The present Application for Patent claims priority to Provisional Application No. 60/828,603 entitled "METHOD AND APPARATUS FOR DETECTING SIGNALS AT VERY LOW SNR" filed Oct. 6, 2006, and assigned to the assignee hereof and hereby expressly incorporated by reference herein.

BACKGROUND

1. Field

The present disclosure relates generally to communications, and more specifically to detecting a presence of a signal in a communication channel.

2. Background

Recently, the Federal Communications Commission (FCC) proposed new rules that would allow unlicensed cognitive radios to operate in geographically unused television (TV) channels. While the new rules may introduce numerous channels for use by the cognitive radios, several licensed transmissions occupy the TV channels including analog TV, digital TV, and professional wireless microphones. If any of these licensed transmissions is present above a certain power threshold, then the TV channel is deemed to be occupied; otherwise, the TV channel is deemed to be unoccupied and hence available for unlicensed wireless use. Thus, there is a need for identifying the presence of a signal in a given communication channel.

SUMMARY

In one aspect of the disclosure, an apparatus is provided for detecting a presence of a signal in a communication channel. The apparatus includes a processor configured to select one or more peak samples of two or more fields of a sampled signal. The processor is further configured to determine one or more absolute values of the one or more peak samples of the two or more fields. In addition, the processor is configured to superimpose the one or more absolute values of the one or more peak samples of the two or more fields. The processor is further configured to combine the one or more absolute values that fall within a predetermined window to produce a peak value. The processor is further configured to compare the peak value with a threshold to determine a presence of a signal in the communication channel.

In another aspect of the disclosure, an apparatus is provided for detecting a presence of a signal in a communication channel. The apparatus includes means for selecting one or more peak samples of two or more fields of a sampled signal. The apparatus further includes means for determining one or more absolute values of the one or more peak samples of the two or more fields. In addition, the apparatus includes means for superimposing the one or more absolute values of the one or more peak samples of the two or more fields. The apparatus further includes means for combining the one or more absolute values that fall within a predetermined window to produce a peak value. The apparatus further includes means for comparing the peak value with a threshold to determine a presence of a signal in the communication channel.

In a further aspect of the disclosure, a cognitive radio is provided for sensing a radio frequency spectrum utilizing a method of a low false alarm rate and a high probability of detection. The cognitive radio includes a correlator configured to compare a known pattern with two or more fields of a sampled signal to provide one or more peak samples of the two or more fields of the sampled signal. The cognitive radio further includes a processing module configured to determine one or more absolute values of the one or more peak samples of the two or more fields. The processing module is further configured to superimpose the one or more absolute values of the one or more peak samples of the two or more fields. In addition, the processing module is configured to combine the one or more absolute values that fall within a predetermined window to produce a peak value. The processing module is further configured to compare the peak value with a threshold to determine a presence of a signal in the communication channel.

In yet a further aspect of the disclosure, a method for detecting a presence of a signal in a communication channel is described. The method includes selecting one or more peak samples of two or more fields of a sampled signal. The method further includes determining one or more absolute values of the one or more peak samples of the two or more fields. In addition, the method includes superimposing the one or more absolute values of the one or more peak samples of the two or more fields. The method further includes combining the one or more absolute values that fall within a predetermined window to produce a peak value and comparing the peak value with a threshold to determine a presence of a signal in the communication channel.

In yet a further aspect of the disclosure, a machine-readable medium includes instructions executable by a processor. The instructions include code for selecting one or more peak samples of two or more fields of a sampled signal and code for determining one or more absolute values of the one or more peak samples of the two or more fields. In addition, the instructions include code for superimposing the one or more absolute values of the one or more peak samples of the two or more fields. The instructions further include code for combining the one or more absolute values that fall within a predetermined window to produce a peak value and code for comparing the peak value with a threshold to determine a presence of a signal in the communication channel.

It is understood that other embodiments of the subject technology will become readily apparent to those skilled in the art from the following detailed description, wherein various embodiments of the subject technology are shown and described by way of illustration. As will be realized, the subject technology is capable of other and different embodiments and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below in connection with the appended drawings is intended as a description of various configurations of the subject technology and is not intended to represent the only configurations in which the subject technology may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
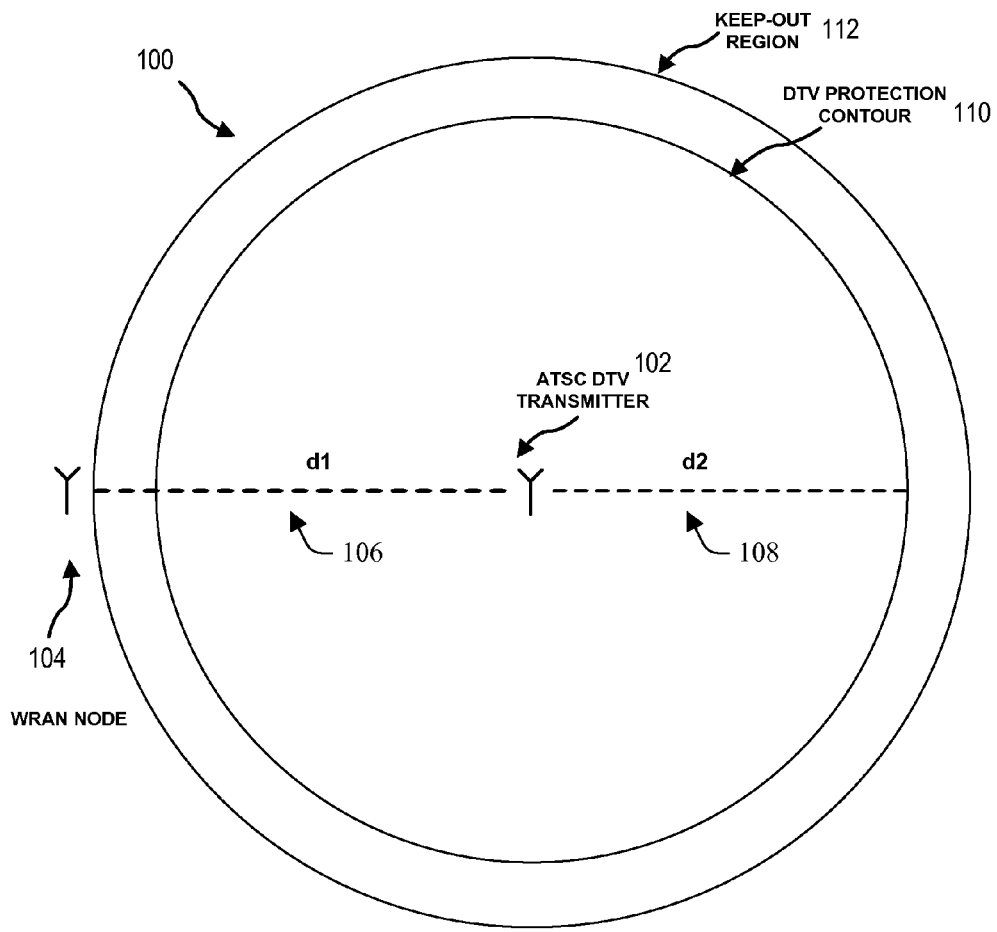
FIG. 1 is an illustration of an exemplary Advanced Television Systems Committee (ATSC) digital TV (DTV) system.

FIG. 1 is an illustration of an exemplary Advanced Television Systems Committee (ATSC) digital TV (DTV) system 100. The system 100 includes an ATSC DTV transmitter 102 that propagates an electromagnetic television signal. Based on the radio frequency (RF) propagation curves, a DTV protection contour 110 having a distance d2 108 may be defined using the RF field strength. The protection contour 110 defines a region where TV receivers are protected from harmful interferences.

A keep-out region 112 is a region defined by a distance d1 106 from the transmitter 102. The keep-out region 112 includes the protection contour 110. Under FCC standards, cognitive radios are generally not permitted in the keep-out region 112. To ensure that unlicensed cognitive radios do not cause harmful interference to the TV receivers and abide by the FCC standards, these cognitive radios are placed away from the transmitter 102 outside the keep-out region 112. Placing the unlicensed cognitive radios outside the keep-out region 112 allows the cognitive radio signals to attenuate sufficiently before reaching the TV receivers, and thus these cognitive radio signals do not cause harmful interference to the TV receivers.

For illustration purposes, both the protection contour 110 and keep-out region 112 are defined as circular areas around the transmitter 102. However, the protection contour 110 and keep-out region 112 can take any number of shapes and can also be affected by the geography of the surrounding area, height of the transmitter, weather, power, etc.

Continuing with FIG. 1, the system 100 further includes a Wireless Regional Area Network (WRAN) node 104 that can include a cognitive radio. A cognitive radio can sense the presence of a licensed signal at a very low signal-to-noise ratio (SNR). Thus, a cognitive radio may be in a faded location and still detect a licensed transmission. A cognitive radio may be a communication device, including, for example, without limitation, a computer, a laptop computer, a telephone, a mobile telephone, a transceiver, a receiver, a personal digital assistant (PDA), an audio player, a game console, a camera, a camcorder, an audio device, a video device, a multimedia device, a component of any of the foregoing (e.g., a printed circuit board(s), an integrated circuit(s), or a circuit component(s)), or any other device capable of receiving a signal. A cognitive radio may sense the radio frequency (RF) spectrum with the goal of identifying unused spectrum that may be used for unlicensed wireless operation. Furthermore, a cognitive radio may be used to identify whether an ATSC DTV signal is present in a given TV channel.

Cognitive radios may determine whether they are outside the keep-out region 112 by detecting the presence of an ATSC DTV signal in a TV channel. The ATSC DTV standard specifies several synchronization patterns. One synchronization pattern is the PN511, which consist of 511 VSB symbols. There is also a PN63 synchronization pattern, which consists of 63 symbols.

Figure 2A:
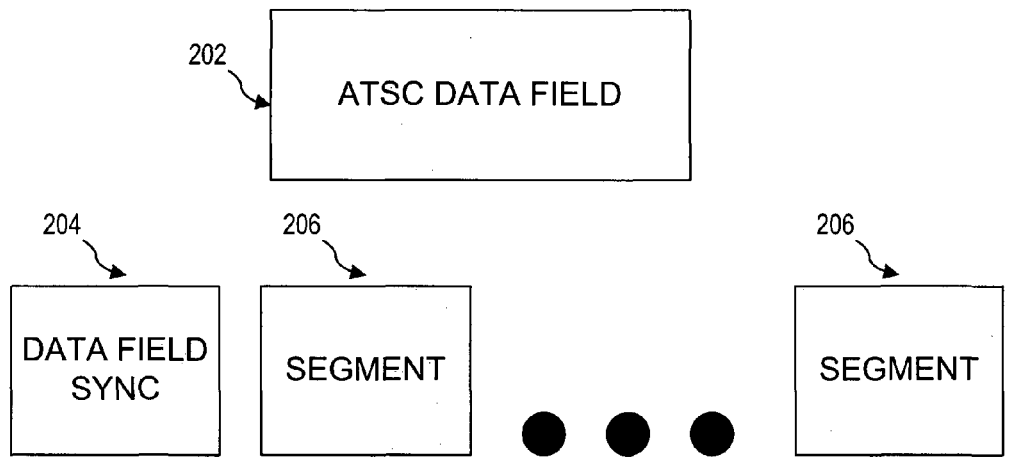
FIG. 2a is a conceptual block diagram illustrating an exemplary ATSC Data Field.

FIG. 2a is a conceptual block diagram illustrating an exemplary ATSC Data Field 202. The ATSC Data Field 202 includes 313 segments (see 204 and 206). Each segment represents data and information pertaining to the ATSC Data Field 202. The first segment is called a Data Field Sync 204. The other segments are shown as segments 206 in FIG. 2a.

Figure 2B:
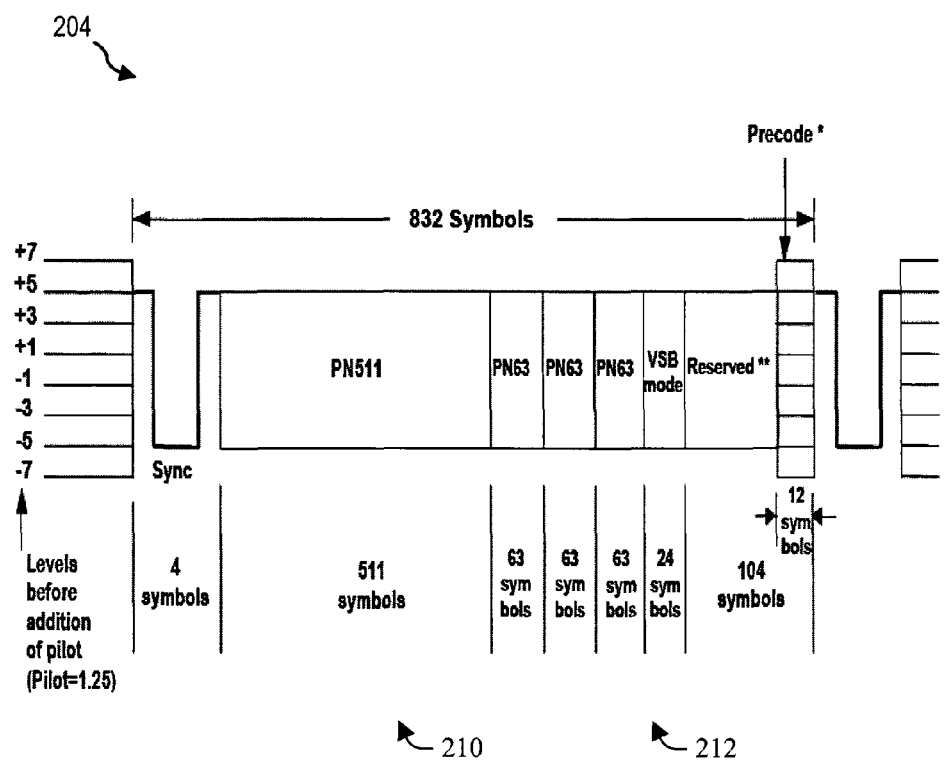
FIG. 2b is a conceptual block diagram illustrating an exemplary ATSC Data Field Sync.

FIG. 2b is a conceptual block diagram illustrating an exemplary ATSC Data Field Sync 204. In the exemplary Data Field Sync 204, a PN511 sync pattern and three copies of the PN63 sync pattern are shown. The middle PN63 sync pattern can be inverted on every other Data Field Sync 204. The Data Field Sync 204 also includes 4 symbols for a Sync, 24 symbols for a VSB mode, and 104 symbols for a reserved portion of the Data Field Sync 204 and a Precode portion. In total, the Data Field Sync 204 contains 832 symbols, and the ATSC Data Field 202 contains 260,416 samples (313 segments multiplied by 832 symbols per segment).

There are several choices that may be used for the sync pattern. The first choice is the PN511 sync pattern. The second choice is the PN511 sync pattern concatenated with the PN63 sync pattern. The third choice is the PN511 sync pattern concatenated with the PN63 sync pattern concatenated with 63 zeros concatenated with the PN63 sync pattern. The fourth choice is the PN511 sync pattern concatenated with 126 zeros concatenated with the PN63 sync pattern. One preferred choice is the third choice since it has the largest number of non-zero elements.

Figure 3A:
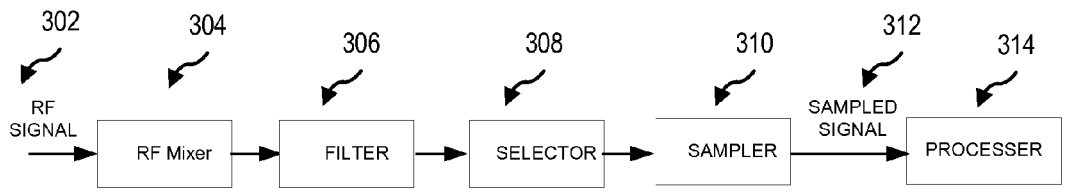
FIG. 3a is a conceptual block diagram illustrating an exemplary configuration of a cognitive radio or a communication device.
Figure 3B:
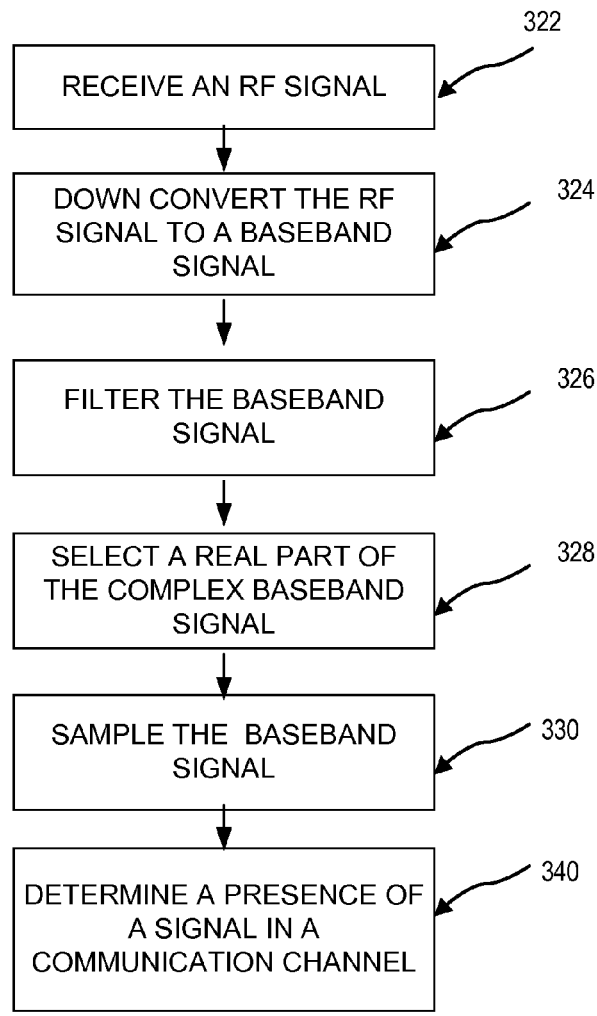
FIG. 3b is a flow chart illustrating an exemplary method of detecting a presence of a signal in a communication channel.

FIG. 3a is a conceptual block diagram illustrating an exemplary configuration of a cognitive radio (or a communication device) 301, and FIG. 3b is a flow chart illustrating an exemplary method of detecting a presence of a signal in a communication channel. A method for converting an RF signal 302 into a sampled signal 312 is described below with reference to FIGS. 3a and 3b. A cognitive radio (or a communication device) 301 includes an RF mixer 304, a filter 306, a selector 308, a sampler 310, and a processor 314. At block 322, the RF mixer 304 receives an RF signal 302. The received RF signal 302, which may be an ATSC DTV signal, can include a sinusoidal pilot that is nominally 309 KHz above the lower band edge of the TV channel.

At block 324, the RF mixer 304 with both In-phase and Quadrature-phase branches down converts the received RF signal 302 to a baseband signal so as to bring the pilot tone down to DC. One skilled in the art would appreciate that there are many methods and devices for estimating the pilot frequency.

At block 326, the filter 306, which may be a low pass filter, filters the baseband signal. The baseband signal is a complex signal having a real part and an imaginary part. The filter 306 may remove any unnecessary signal components while enhancing the sought after signals. At block 328, the selector 308 selects the real part of the complex baseband signal. At block 330, the sampler 310 samples the baseband signal to produce a sampled signal 312, which is a real digital baseband signal. Sampling may occur at the symbol rate of 10.76 MHz. Alternatively, sampling may occur at a higher rate (e.g., twice the symbol rate.) This can improve the output of a correlator 402 (see FIG. 4) due to an increased chance of alignment in the correlator pattern and the sampled signal 312. At block 340, the processor 314 uses the sampled signal 312 from the sampler 310 to determine a presence of a signal in a communication channel, as will be described in more detail with respect to FIGS. 4 to 9.

FIGS. 3a and 3b illustrate only one exemplary configuration and method, and other configurations and methods may be utilized. For example, the devices and blocks shown in FIGS. 3a and 3b may be placed in an order different from the order presented in these figures. For instance, the sampler 310 can be placed before the filter 306. Devices and blocks that are different from those shown in FIGS. 3a and 3b may be also utilized. Furthermore, a cognitive radio may include other device(s) or include only some of the devices shown in FIG. 3a. In addition, the devices shown in FIG. 3a may be partitioned differently (e.g., the filter 306, the selector 308, and the sampler 310 may be included in the processor 314; the selector 308 and the sampler 310 may be grouped into one block).

Figure 4:
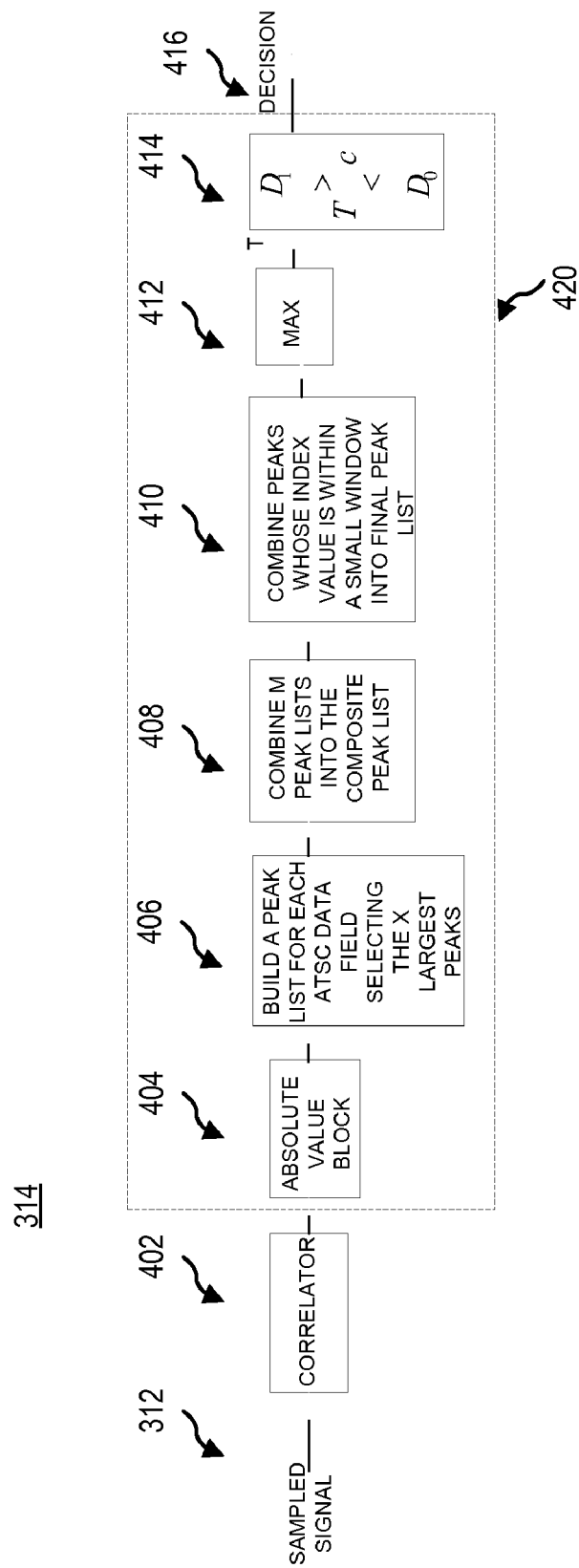
FIG. 4 is a conceptual block diagram illustrating an exemplary configuration of a processor.

FIG. 4 is a conceptual block diagram illustrating an exemplary configuration of a processor 314. A processor may be implemented using software, hardware, or a combination of both. By way of example, a processor 314 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. A processor may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processor 314. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a cognitive radio or a communication device or by a processor of a cognitive radio or a communication device. Instructions can be, for example, a computer program or software program including code.

The processor 314 is shown with a correlator 402 and a processing module 420. The processing module 420 includes blocks 404, 406, 408, 410, 412 and 414. After a potential ATSC DTV signal 302 is converted to baseband and sampled at the symbol rate, the sampled signal 312 is sent through a correlator 402. The correlator 402 compares the signal 312 with a known pattern by, for example, sliding them against each other and then attempting to determine how closely the sequences resemble as they move with respect to each other in time scale. The know pattern can be one or more of the sync patterns described with respect to the ATSC Data Field Sync 204 in FIGS. 2a and 2b. When using the ATSC Data Field Sync 204, the correlator matches the sync pattern every 260, 416 samples (313 segments×832 symbols per segment).

The correlator 402 can be described by the equation:

$$y(n) = \sum_{i=0}^{N-1} r(n-i)x(i)$$

wherein y(n) represents an output of the correlator 402, r(n−i) represents an input of the correlator 402, the input being a sampled signal 312, x(i) represents a value in the correlator 402, N is an integer, n is an integer, and i is an integer that varies from 0 to N−1. Largest outputs of the correlator 402 may be referred to as "peaks" or "peak samples." A peak sample can be either a large positive value or a large negative value. A main distinction between the peak samples and the other outputs of the correlator 402 are that peak samples are large relative to the majority of the correlator outputs.

Each of these peak samples is a potential match of the sync pattern. When we have high SNR, then the largest peak sample, which repeats every ATSC Data Field 202 is most likely an actual match with the DTV sync pattern. However, in low SNR conditions, it may not be sufficient to just select the largest output and use that as the test statistic, because it may lead to a high false alarm rate or a low probability of detection. According to one aspect, the subject technology can define a test statistic that gives both a low false alarm rate and a high probability of detection in the condition of low SNR.

Figure 5A:
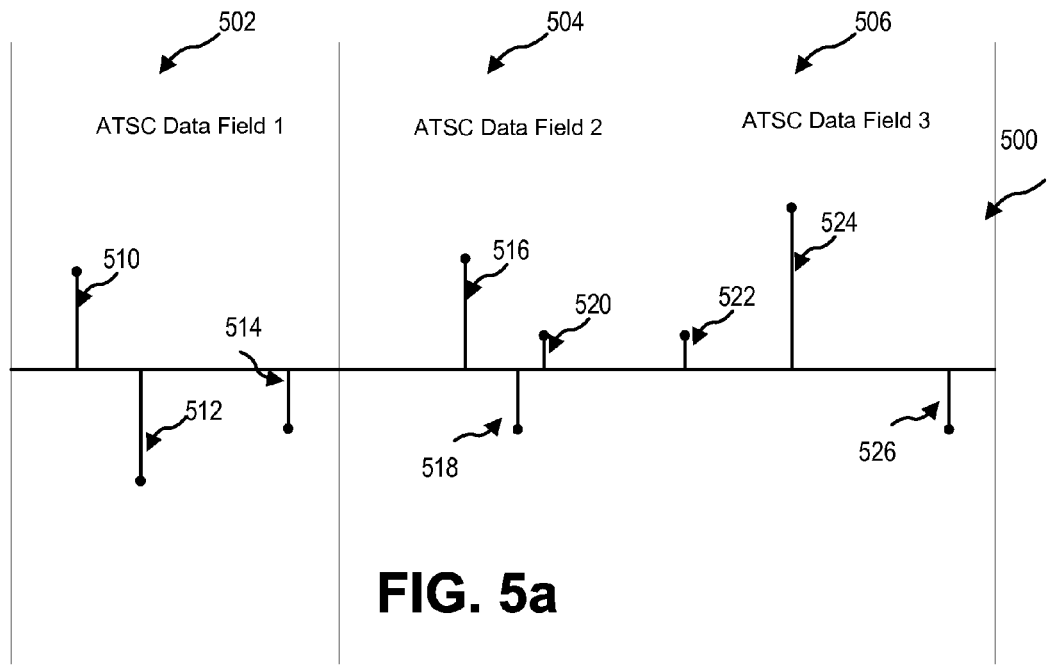
FIG. 5a is a chart illustrating exemplary peak samples in multiple fields of a sampled signal.

FIG. 5a is a chart illustrating exemplary peak samples in three fields 502, 504 and 506 of a sampled signal 500 based on the output, y(n), of the correlator 402. ATSC Data Field 1 502 has three peak samples 510, 512, and 514. ATSC Data Field 2 504 has three peak samples 516, 518, and 520. ATSC Data Field 3 506 has three peak samples 522, 524, and 526. Not shown are other outputs smaller in magnitude that exist due to noise. Each field may include a greater or a less number of peak samples, and each field can have a different number of peak samples. Still yet, a field may include no peak samples. Furthermore, a sample signal may include a greater or a less number of fields.

As shown, the peak samples may vary from field to field of the signal 500 with respect to position and magnitude. A number of factors exist that may degrade the output of the correlator 402: (i) the correlator 402 may be misaligned with symbol boundaries, (i) the alignment of the correlator 402 with the sync pattern tends to change slightly from one data field sync to the next, and (iii) due to multi-paths, there may be a reversal in the polarity of the sync pattern from one data field sync to the next. One skilled in the art would understand that when signals reach a point by two or more paths, these two or more paths can be referred to as multi-paths. The effects of the multi-paths may include constructive and destructive interferences and phase shifting of the signal.

Figure 5B:
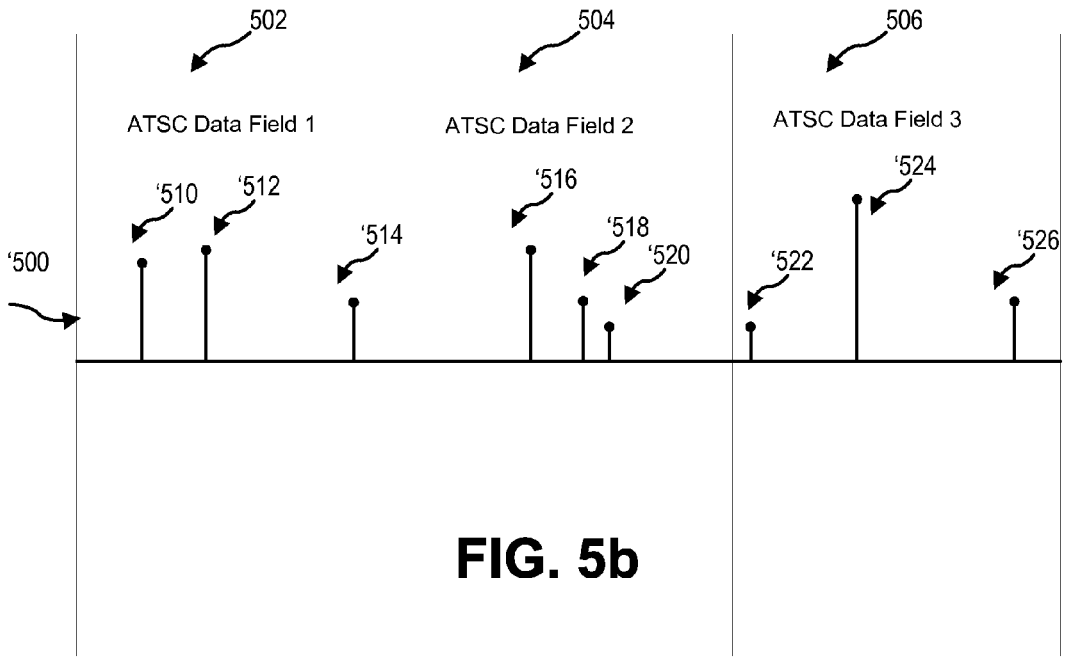
FIG. 5b is a chart illustrating exemplary absolute values of peak samples in multiple fields of a sampled signal.

Referring back to FIG. 4, after the correlator 402 compares the sampled signal 312 with a known pattern, an absolute value block 404 receives the output of the correlator 402 (e.g., the peak samples shown in FIG. 5a and other samples), and generates an absolute value of each output of the correlator 402. By generating an absolute value for each output of the correlator 402, a reversal in polarity of the sync pattern from one data field sync to the next due to multi-paths can be handled. FIG. 5b is a chart illustrating the absolute values '510 through '526 of the peak samples 510 through 526 in the multiple fields 502, 504 and 506 of a sampled signal 500. ATSC Data Field 502 has three peak samples '510, '512, and '514, where the negative values 512 and 514 are inverted into positive values '512 and '514. ATSC Data Field 504 has three peak samples '516, '518, and '520, where the negative value 518 is inverted into positive value '518. ATSC Data Field 506 has three peak samples '522, '524, and '526, where the negative value 526 is inverted into the positive value '526.

Returning again to FIG. 4, at block 406, a list of peaks is built for each of the ATSC Data Fields 502, 504 and 506 by selecting the X largest peaks, where X is an integer. The list includes recorded information corresponding to the index within the Data Field (an integer between 1 and 260,416) and the magnitude of the peak.

Table 1 illustrates a peak list in the case of X=3.

TABLE 1

Peak List for One ATSC Data Field

| Peak Index | Magnitude of the Peak |
|---|---|
| $i_1$ | $p_1$ |
| $i_2$ | $p_2$ |
| $i_3$ | $p_3$ |

Figure 6:
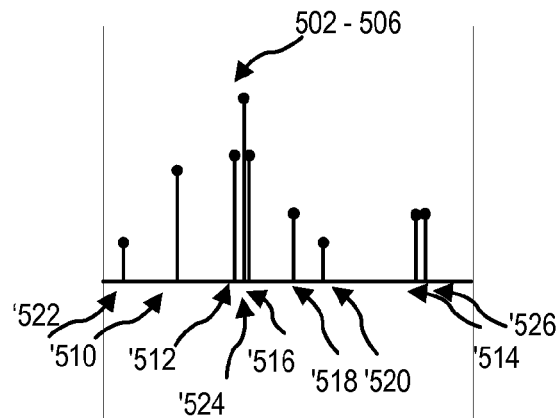
FIG. 6 is a chart illustrating graphically an exemplary composite peak list.

This process is repeated for M ATSC Data Fields 202 creating M peak lists. For example, for three fields 502, 504 and 506, there are three peak lists. At block 408, the M peak lists are then combined into one composite peak list consisting of M×X peaks, with each peak represented by an index value and a magnitude. FIG. 6 is a chart illustrating graphically an exemplary composite peak list. This chart illustrates superimposing graphically the absolute values of the peak samples '510 through '526 of the three ATSC Data Fields 502, 504 and 506.

If an ATSC DTV signal is present, it is likely that in each of the ATSC Data Fields 502, 504 and 506, one of the X peaks in the peak list is due to a positive correlation of the sync pattern with the Data Field Sync 204 embedded in the ATSC DTV signal. It is also likely that in other ATSC Data Fields 202, one of the X peaks in the peak list is also due to a positive match with the Data Field Sync 204. In addition, the index values for these correct correlation matches are likely to be equal or within a small tolerance. The reason the index value does not always match exactly may be due to small errors in the clock.

Continuing with FIG. 4, at block 410, the composite peak list of length M×X peaks that have index values within a tolerance are combined into one large peak in a final peak list by adding the magnitudes. The value of the peak, at a given index value, in the final peak list is the sum of all peaks from the composite peak list within a predetermined window (e.g., ±k of the index value). If there are no peaks in the composite peak list within that window of the index value, then there is no peak in the final peak list at that index value. According to one aspect of the disclosure, k may be an integer representing the number of sample indexes selected for each side of a given index value. The value of k may be a small number. For example, k may be 1 or 2 if a signal is sampled at the symbol rate or may be 2 or 4 if a signal is sampled at twice the symbol rate. The subject technology is, however, not limited to these exemplary k values.

This is explained further using the following illustrations according to one aspect of the disclosure. If a sampler 310 of FIG. 3a samples a signal at the symbol rate and generates 1000 samples, then these samples have index values between 0 and 999. A correlator 402 of FIG. 4 may generate output samples, some of which may be peak samples. For example, a first ATSC Data Field may have a first peak sample at index value 55 and a second peak sample at index value 143. A second ATSC Data Field may have a first peak sample at index value 56 and a second peak sample at index value 144. As discussed previously, there may be more than two fields, and there may be more or less than two peak samples in each field. In this example, two fields and two peak samples are described for illustration purposes. If an index value 143 is selected, and k is selected to be 2, then all peak samples at ±2 of index value 143 (i.e., index values 141, 143, 143, 144 and 145) are combined. Thus, in this example, the second peak sample of the first ATSC Data Field at index value 143 and the second peak sample of the second ATSC Data Field at index value 144 are combined to produce one large peak in the final peak list.

In another example, if the sampling rate is increased (e.g., twice the symbol rate), then there will be a greater number of samples (e.g., 2000 samples). If it is desired to keep the size of the predetermined window to be the same for all sampling rates, then when the sampling rate increases (e.g., from the symbol rate to twice the symbol rate), the value of k can be also increased (e.g., from 2 to 4). This allows the size of the predetermined window to be the same in actual time even when the sampling rates change. Thus, according to one aspect, the size of a predetermined window is independent of the sampling rate. One skilled in the art would appreciate that the illustrations presented above are not limiting, but rather describe some aspects of the subject technology.

Figure 7:
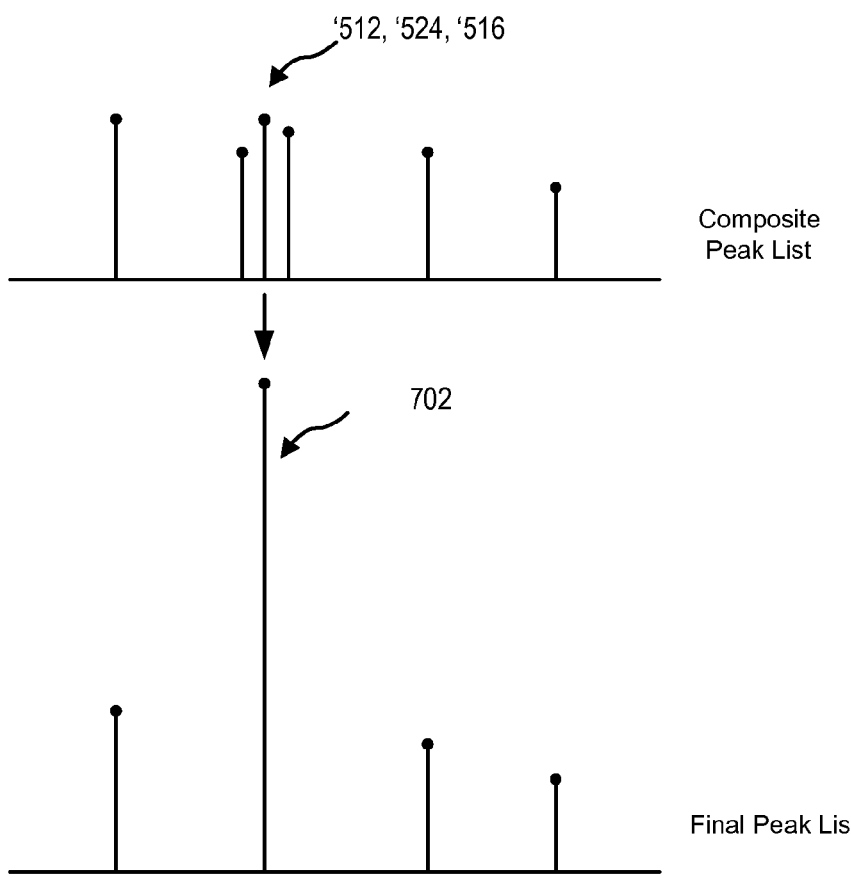
FIG. 7 is a chart illustrating graphically an exemplary final peak list.

The utilization of a predetermined window (e.g., ±k of an index value) allows the subject technology to combine peaks from multiple fields that are not exactly synchronized. Thus, the subject technology can accurately detect the presence of a signal even when the correlator 402 is not aligned with the symbol boundaries and even when the alignment of the correlator 402 with the sync pattern tends to change slightly from one data field sync to the next. FIG. 7 is a chart illustrating graphically an exemplary final peak list. This chart illustrates an exemplary combination of absolute values of the peaks that are within a predetermined window. Peaks '512, '524, and '516 within a predetermined window are combined to form a peak 702 by adding the magnitudes of peaks '512, '524, and '516. Peak 702 corresponds to the maximum of all peaks in the final peak list within the predetermined window.

At block 412, peak 702 in the final peak list, referred to as the final test statistic, T, is then compared to a threshold, which is a constant value c. The constant value c may be chosen so as to obtain a desired probability of false alarm. The final decision process can be written as:

$$T \begin{matrix} D_1 \\ > \\ < \\ D_0 \end{matrix} c$$

If the test statistic T is greater than the threshold c, then the method selects decision $D_1$, which is a decision 416 that the ATSC DTV signal is present. If the test statistic T is less than the threshold c, then the method selects decision $D_0$, which is a decision 416 that the ATSC DTV signal is not present.

If only one ATSC Data Field 202 is used, then a test statistic, T, can be obtained by selecting the maximum of the absolute value of the output of a correlator. This can be expressed as:

$$T = \text{Max}(\text{Abs}(y(n)))$$

Figure 8:
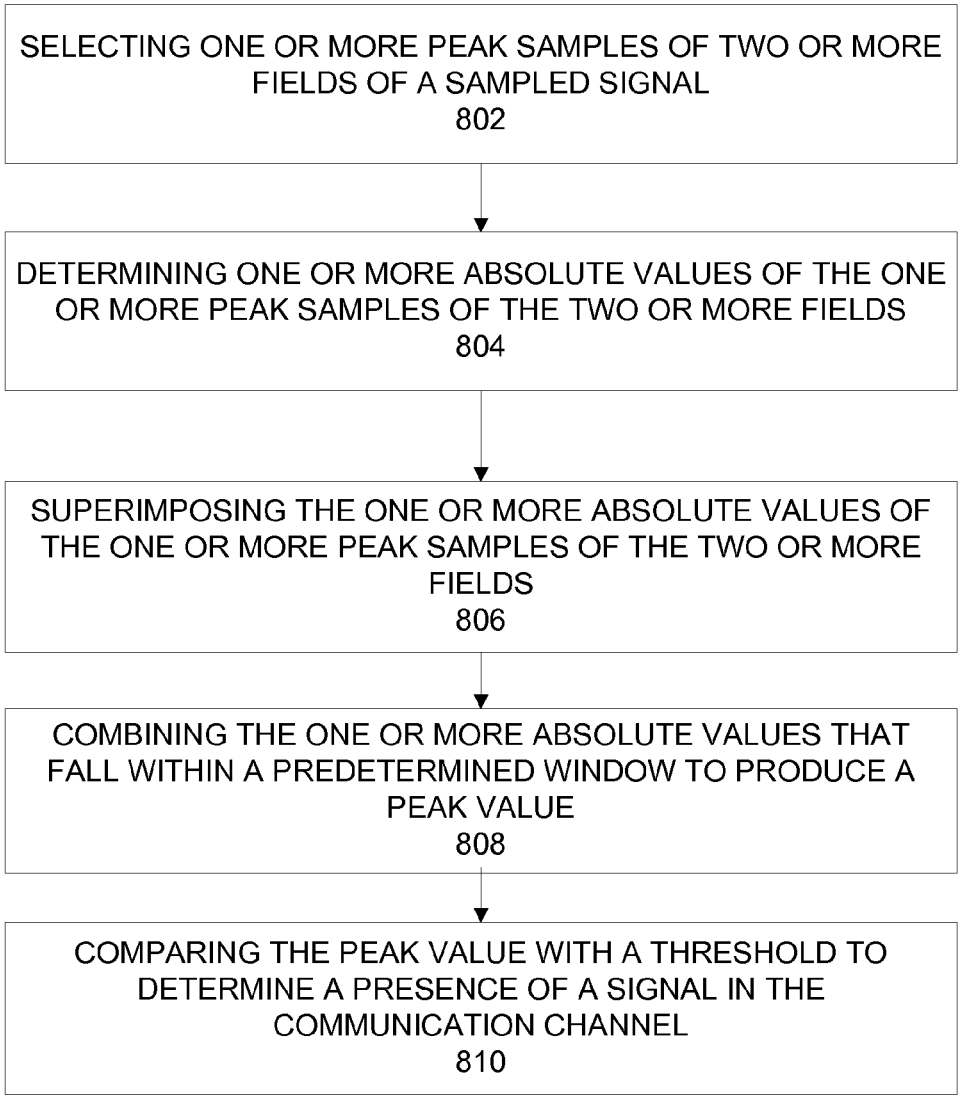
FIG. 8 is a flow chart illustrating an exemplary method of detecting a presence of a signal in a communication channel.

FIG. 8 is a flow chart illustrating an exemplary method of detecting a presence of a signal in a communication channel. In block 802, one or more peak samples of two or more fields of a sampled signal are selected. In block 804, one or more absolute values of the one or more peak samples of the two or more fields are determined. In block 806, the one or more absolute values of the one or more peak samples of the two or more fields are superimposed. In block 808, the one or more absolute values that fall within a predetermined window are combined to produce a peak value. In block 810, the peak value is compared with a threshold to determine a presence of a signal in the communication channel. A processor 314 may perform the blocks 802, 804, 806, 808 and 810 according to one aspect of the disclosure.

According to one aspect of the disclosure, the method further includes correlating a known pattern with the two or more fields of the sampled signal to provide the one or more peak samples along with other samples prior to block 802 and block 804. The other samples may be outputs of a correlator 402 (see FIG. 4) that are smaller in magnitude compared to the magnitude of the one or more peak samples. In this instance, the procedure described at block 804 determines the absolute values of not only the one or more peak samples but also the other samples. Thus, an absolute value is generated for each of the peak samples and the other samples. The procedure described at block 802 can be performed after block 804 to select the largest peak(s), which may represent the one or more peak samples. The largest peak(s) do not include the other samples.

According to another aspect of the disclosure, the procedure described at block 802 includes (a) correlating a known pattern with the two or more fields of the sampled signal to provide the one or more peak samples along with other samples and (b) selecting the largest peak(s), which may be the one or more peak samples. According to yet another aspect, the procedure described at block 802 includes correlating a known pattern with the two or more fields of the sampled signal to provide the one or more peak samples. These peak samples may represent the largest peak(s). According to yet another aspect of the disclosure, block 802 is performed before block 804. According to yet another aspect, block 802 is performed after block 804.

According to one aspect of the present disclosure, peaks or peak samples (along with other samples) are outputs of a correlator 402. An absolute value block 404 is located after the correlator 402. Thus, the outputs of the correlator 402 are sent to the absolute value block 404. The largest peaks refer to those outputs of the correlator 402 having the largest absolute values. These outputs can be the direct outputs of the correlator 402 (i.e., the outputs right after the correlator 402) or the indirect outputs of the correlator 402 (e.g., the outputs of the absolute value block 404, which are the outputs of the correlator 402 that have passed through the absolute value block 404). As described above, a peak may be a large positive value (see, e.g., 510 in FIG. 5a) or a large negative value (see, e.g., 512 and 514 in FIG. 5a). These are the peaks prior to being processed by the absolute value block 404. A largest peak may also be a large positive value or a large negative value. Thus, the largest peaks can include both large positive and large negative peaks. After being processed by the absolute value block 404, a peak is a positive value (see, e.g., '510, '512 and '514 in FIG. 5b), and a largest peak is a large positive value. Thus, by having an absolute value block 404, the subject technology provides the ability to detect and process peaks and largest peaks having positive as well as negative values.

Figure 9:
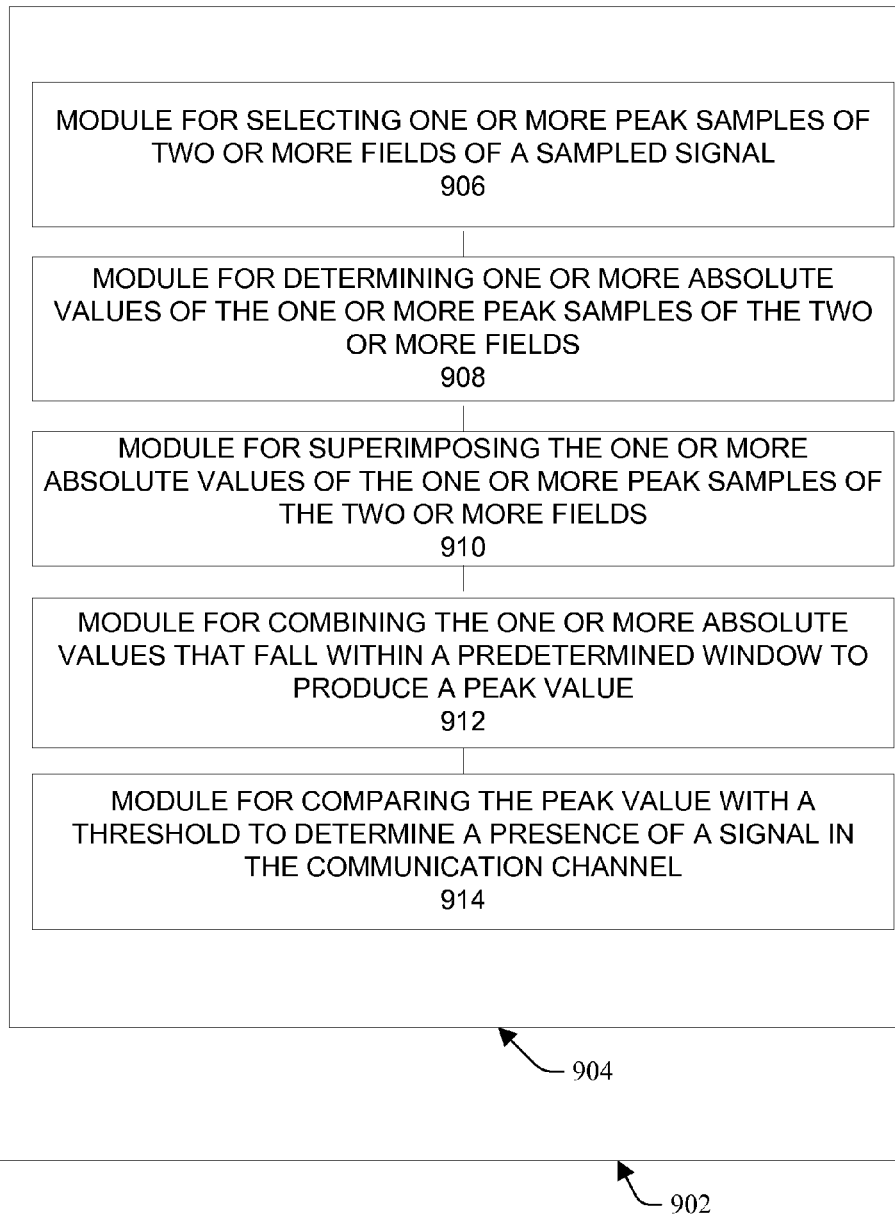
FIG. 9 is a conceptual block diagram of an exemplary configuration of an apparatus for detecting a presence of a signal in a communication channel.

FIG. 9 is a conceptual block diagram of an exemplary configuration of an apparatus for detecting a presence of a signal in a communication channel. A cognitive radio (or a communication device) 902 may include a processor 904 that includes a module 906 for selecting one or more peak samples of two or more fields of a sampled signal. The processor 904 may further include a module 908 for determining one or more absolute values of the one or more peak samples of the two or more fields. In addition, the processor 904 may include a module 910 for superimposing the one or more absolute values of the one or more peak samples of the two or more fields. Further, the processor 904 may include a module 912 for combining the one or more absolute values that fall within a predetermined window to produce a peak value. Still further, the processor 904 may include a module 914 for comparing the peak value with a threshold to determine a presence of a signal in the communication channel.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for detecting a presence of a signal in a communication channel, comprising:

a processor configured to select one or more peak samples of two or more fields of a sampled signal, the processor further configured to determine one or more absolute values of the one or more peak samples of the two or more fields, the processor further configured to superimpose the one or more absolute values of the one or more peak samples of the two or more fields, the processor further configured to combine the one or more absolute values that fall within a predetermined window to produce a peak value, the processor further configured to compare the peak value with a threshold to determine a presence of a signal in the communication channel, the processor further configured to correlate a known pattern with the two or more fields of the sampled signal to provide the one or more peak samples and other samples that match the known pattern, wherein the processor comprises a correlator configured to correlate the known pattern with the two or more fields of the sampled signal to provide the one or more peak samples and the other samples, wherein an input and an output of the correlator have the following relationship:

$$y(n) = \sum_{i=0}^{N-1} r(n-i)x(i)$$

wherein y(n) represents an output of the correlator, r(n−i) represents an input of the correlator, the input being a digital signal, x(i) represents a value in the correlator, N is an integer, n is an integer, and i is an integer that varies from 0 to N−1.

2. The apparatus of claim 1, wherein the processor is configured to select one or more largest peaks as the one or more peak samples of the two or more fields of the sampled signal.

3. The apparatus of claim 1, wherein the processor is configured to superimpose the one or more absolute values of the one or more peak samples of the two or more fields by building a list of peaks for each of the two or more fields and by combining the list of peaks into a composite peak list.

4. The apparatus of claim 3, wherein the composite peak list comprises index values and magnitudes of the one or more absolute values of the one or more peak samples of the two or more fields.

5. The apparatus of claim 1, wherein each of the one or more absolute values is represented by an index value and a magnitude, and the predetermined window is within . +−.k of an index value.

6. The apparatus of claim 5, wherein k is 1 or 2.

7. The apparatus of claim 1, wherein the one or more peak samples comprise two or more peak samples.

8. The apparatus of claim 1, wherein the one or more peak samples comprise two or more samples.

9. The apparatus of claim 1, further comprising:

a radio frequency (RF) mixer configured to down covert a received RF signal to a baseband signal;

a filter configured to filter the baseband signal; and a sampler configured to sample the filtered baseband signal to produce the sampled signal.

10. The apparatus of claim 1, wherein the apparatus is a communication device.

11. The apparatus of claim 1, wherein the apparatus is the processor.

12. The apparatus of claim 1, wherein the known pattern is based on an Advanced Television Systems Committee (ATSC) digital television (DTV) standard.

13. The apparatus of claim 1, wherein the communication channel is a TV channel.

14. An apparatus for detecting a presence of a signal in a communication channel, comprising:

means for selecting one or more peak samples of two or more fields of a sampled signal;

means for determining one or more absolute values of the one or more peak samples of the two or more fields;

means for superimposing the one or more absolute values of the one or more peak samples of the two or more fields;

means for combining the one or more absolute values that fall within a predetermined window to produce a peak value;

means for comparing the peak value with a threshold to determine a presence of a signal in the communication channel; and means for correlating a known pattern with the two or more fields of the sampled signal to provide the one or more peak samples and other samples that match the known pattern, wherein an input and an output of the means for correlating have the following relationship:

$$y(n) = \sum_{i=0}^{N-1} r(n-i) \times (i)$$

wherein y(n) represents an output of the means for correlating, r(n−i) represents an input of the means for correlating, the input being a digital signal, x(i) represents a value in the means for correlating, N is an integer, n is an integer, and i is an integer that varies from 0 to N−1.

15. The apparatus of claim 14, wherein the means for selecting is configured to select one or more largest peaks as the one or more peak samples of the two or more fields of the sampled signal.

16. A cognitive radio for sensing a radio frequency spectrum utilizing a method of a low false alarm rate and a high probability of detection, the cognitive radio comprising:

a correlator configured to compare a known pattern with two or more fields of a sampled signal to provide one or more peak samples of the two or more fields of the sampled signal; and a processing module configured to determine one or more absolute values of the one or more peak samples of the two or more fields, the processing module further configured to superimpose the one or more absolute values of the one or more peak samples of the two or more fields, the processing module further configured to combine the one or more absolute values that fall within a predetermined window to produce a peak value, the processing module further configured to compare the peak value with a threshold to determine a presence of a signal in the communication channel, the processing module further configured to correlate a known pattern with the two or more fields of the sampled signal to provide the one or more peak samples and other samples that match the known pattern,
wherein the processing module comprises a correlating module configured to correlate the known pattern with the two or more fields of the sampled signal to provide the one or more peak samples and the other samples wherein an input and an output of the correlating module have the following relationship:

$$y(n) = \sum_{i=0}^{N-1} r(n-i) \times (i)$$

wherein y(n) represents an output of the correlating module, r(n−i) represents an input of the correlating module, the input being a digital signal, x(i) represents a value in the correlating module, N is an integer, n is an integer, and i is an integer that varies from 0 to N−1.

17. The cognitive radio of claim 16, wherein the one or more peak samples match the known pattern, wherein the correlator is further configured to provide other samples that match the known pattern, wherein the processing module is further configured to receive the one or more peak samples and the other samples, and wherein the processing module is further configured to select the one or more peak samples.

18. A method for detecting a presence of a signal in a communication channel by a cognitive radio, comprising:
receiving a radio frequency (RF) signal at an RF mixer of the cognitive radio;
down converting the RF signal to a baseband signal via the RF mixer;
sampling the baseband signal to provide a sampled signal;
selecting one or more peak samples of two or more fields of the sampled signal;
determining one or more absolute values of the one or more peak samples of the two or more fields;
superimposing the one or more absolute values of the one or more peak samples of the two or more fields;
combining the one or more absolute values that fall within a predetermined window to produce a peak value;
comparing the peak value with a threshold to determine a presence of a signal in the communication channel; and
correlating with a processor, a known pattern with the two or more fields of the sampled signal to provide the one or more peak samples and other samples that match the known pattern, wherein an input and an output of the correlator have the following relationship:

$$y(n) = \sum_{i=0}^{N-1} r(n-i) \times (i)$$

wherein y(n) represents an output of the means for correlating, r(n−i) represents an input of the correlator, the input being a digital signal, x(i) represents a value in the correlator, N is an integer, n is an integer, and i is an integer that varies from 0 to N−1.

19. The method of claim 18, wherein selecting one or more peak samples of two or more fields of a sampled signal is performed before or after determining one or more absolute values of the one or more peak samples of the two or more fields.

20. A non-transitory tangible processor-readable storage medium having stored thereon processor-executable instructions configured to cause a processor of a communication device to perform operations comprising:
selecting one or more peak samples of two or more fields of a sampled signal;
determining one or more absolute values of the one or more peak samples of the two or more fields;
superimposing the one or more absolute values of the one or more peak samples of the two or more fields;
combining the one or more absolute values that fall within a predetermined window to produce a peak value;
comparing the peak value with a threshold to determine a presence of a signal in the communication channel; and
correlating a known pattern with the two or more fields of the sampled signal to provide the one or more peak samples and other samples that match the known pattern, wherein an input and an output of the correlator have the following relationship:

$$y(n) = \sum_{i=0}^{N-1} r(n-i) \times (i)$$

wherein y(n) represents an output of the means for correlating, r(n−i) represents an input of the correlator, the input being a digital signal, x(i) represents a value in the correlator, N is an integer, n is an integer, and i is an integer that varies from 0 to N−1.

* * * * *